Dec. 1, 1959   A. E. GIGUERE   2,914,950
BOTTOM TESTING DEVICE
Filed Dec. 2, 1955
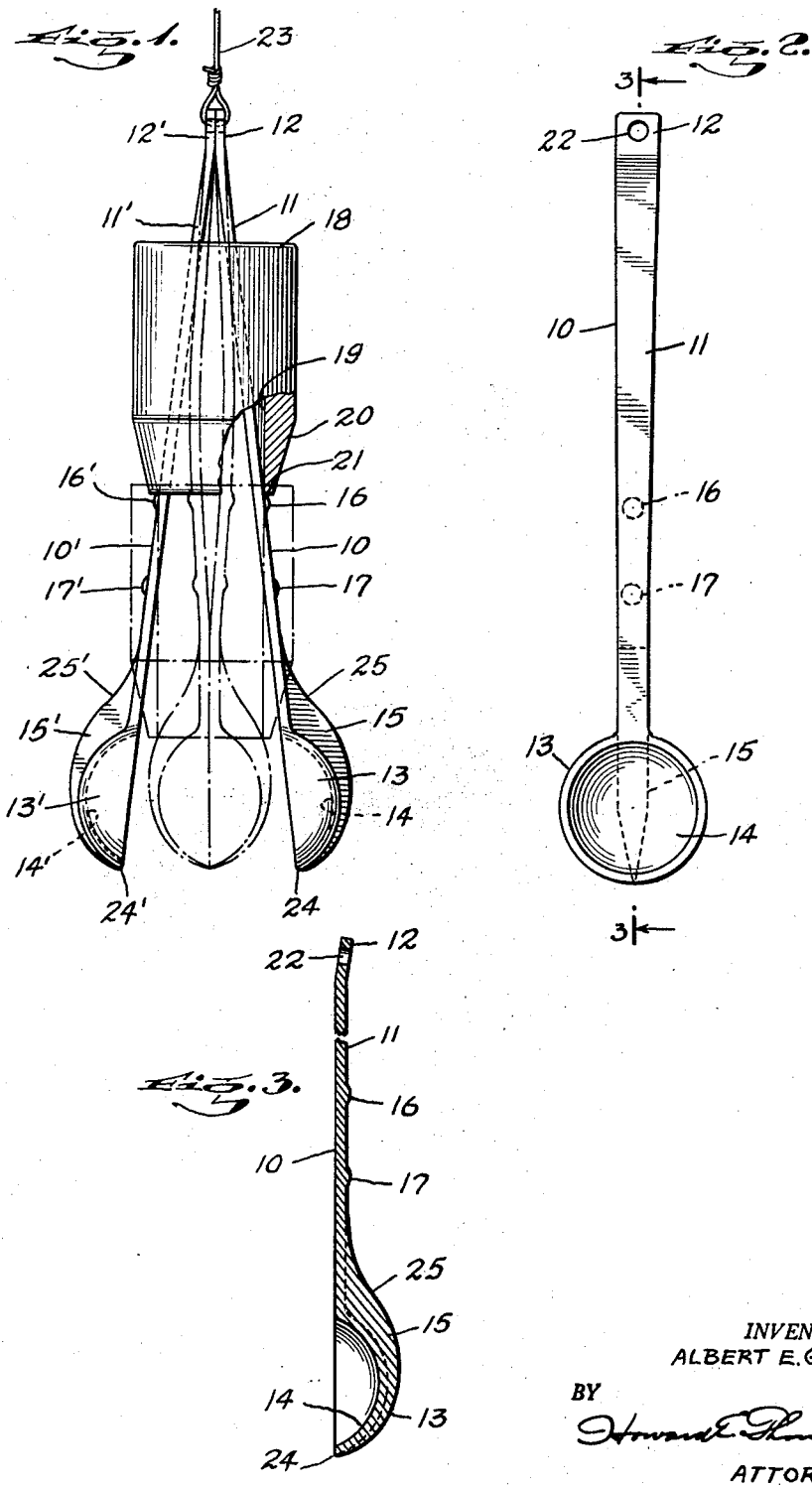
INVENTOR.
ALBERT E. GIGUERE
BY
ATTORNEY

United States Patent Office 2,914,950
Patented Dec. 1, 1959

2,914,950

BOTTOM TESTING DEVICE

Albert E. Giguere, Woodside, N.Y.

Application December 2, 1955, Serial No. 550,643

6 Claims. (Cl. 73—425.2)

This invention relates to devices adapted to be used by fishermen in the testing of the bottom of any waterway to determine the proper type and kind of bait to use prior to fishing. More particularly, the invention deals with a device comprising two substantially similar parts, spoon-like in general contour and collectively forming a substantially closed chamber, when the spoon heads are brought into engagement with each other for collecting and retrieving part of a bottom which can be raised to the surface for testing.

Still more particularly, the invention comprises a device of the character described having a weight normally positioned at the handle end portions of the spoon structures and the device having means providing a trigger-like release of the weight for movement in the direction of the head ends of the spoons in the operation of automatically closing the spoons around a part of the bottom while, at the same time, driving the spoon heads into the bottom.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a side view of a device showing the same in the normal open position in full lines and in closed position in dotted lines, with part of the construction broken away and in section.

Fig. 2 is a face view of one of the spoon parts of the device; and

Fig. 3 is a broken section on the line 3—3 of Fig. 2.

A problem has always existed with fishermen to determine the nature or characteristics of a bottom of any waterway such as a river, lake, bay or sea in electing whether or not to fish at that particular location, depending upon the characteristics of the bottom which are noted by the use of a device of the kind under consideration. Further, the device, by virtue of being able to pick up part of the bottom, will also enable the fishermen to judge the type and kind of bait to use in fishing, consistent with fish that are likely to patronize a particular type and kind of bottom in a predetermined waterway.

In carrying my invention into effect, I provide a testing device comprising two similar spoon-like members 10, 10′, which are preferably moulded from plastics. As both members 10, 10′ are of the same construction, the brief description of the part 10 will be applied to the part 10′, the reference characters being primed on the part 10′.

Each device comprises a long handle or shank portion 11, 11′, having an offset apertured end 12, 12′, the shank 11, 11′, for the major portion of its length, being substantially of one thickness, but varying slightly in width, as will appear from a consideration of Fig. 2 of the drawing. The lower end portion of each member has a rounded spoon head 13, 13′, the recesses 14, 14′ of which will collectively form a chamber when the members are brought into engagement with each other, as shown in dotted lines in Fig. 1, so as to pick up, in the chamber, part of a bottom which can be raised to the surface of the water for inspection by the fisherman using the device.

The spoon head end 13, 13′ has, on its outer surface, an upwardly increasing reinforcing rib 15, 15′. The shank 11, 11′ has, intermediate the ends 12, 12′ and 13, 13′ on the outer surface thereof, outwardly extending upper check beads 16, 16′ and lower cam beads 17, 17′. The beads 16, 16′ are adapted to normally retain and support a tubular weight 18, preferably formed of lead or a lead composition, on the raised portion of the shanks 11, 11′ with the shanks flexed outwardly, as indicated in full lines in Fig. 1 of the drawing. The bore 19 of the weight 18 is such as to pass freely over the upper ends 12, 12′ of the members 10, 10′ and the lower end portion of the weight is preferably bevelled, as seen at 20, and terminates in a narrow lower surface 21, adapted to engage the catch beads 16, 16′, as indicated in Fig. 1.

The inner surfaces of the ends 12, 12′ are cemented or otherwise secured together with the apertures 22 of these joined ends in alinement and, by reason of the angularity of the upper ends, the lower head ends are normally flexed outwardly and this outward flexing is checked by the weight 18 so that the weight is supported by the beads 16, 16′ in the raised position. A suitable lowering line 23 is coupled with the apertured ends 12, 12′ to facilitate lowering the device in the water. This operation is performed at a moderate speed and, when the lower end portions 24, 24′ of the spoon heads 13, 13′ strike the bottom, this checks downward movement of the members 10, 10′. Thus, the heavy body of the weight 18 is then tripped over the catch beads 16, 16′ and moves down suddenly in trigger-like fashion, passing over the cam beads 17, 17′ and then onto the upper cam-like surfaces 25, 25′ of the ribs 15, 15′. The latter operation forces adjacent surfaces of the heads 13, 13′ into engagement with each other while, at the same time, trapping part of the bottom, which has been penetrated by the downward driving action of the weight upon the heads 13, 13′, in the chamber formed by the recesses 14, 14′.

Devices of the type and kind under consideration can be made of different sizes and with different weights. The latter is particularly desirable in doing deep-sea fishing so that sufficient weight is provided to operate the device at a substantial depth. The device can be normally stored with a drop line attached to the upper end, with a line wound around the device to hold the weight in position. In other instances, a pin or peg can be passed through the aperture 22 to retain the weight against displacement from the device.

Devices of the type and kind under consideration can be utilized for testing the bottom of different waterways for any purpose whatever and, at the same time, can be utilized as a means for retrieving an object that may be positioned upon a surface which might be difficult or impossible to reach without the use of a fairly long drop line.

It will be apparent that the adjacent surfaces of the spoon heads 13, 13′ form a more or less sealed chamber, which will at least retain particles of a bottom from displacement in the operation of raising the device through the water. The weight will operate to support these surfaces in snug engagement with each other. It will also be apparent that the particular shape of the heads 13, 13′ can be modified to suit the particular type and kind of bottom testing to be performed.

Having fully described my invention, what I claim as new and desire to secure by Letters Patent is:

1. A testing device of the character described, comprising a pair of spoon-like members, said members comprising long shanks having spoon heads at one end, the other end of said members being offset and secured together to dispose the shanks normally in angular relationship to each other, means for attaching a drop line to the offset ends of said members, an elongated cylindrical weight arranged upon and movable longitudinally of the shanks of said members, means, on the shanks, for normally supporting the weight adjacent the second named end portion of said members, and said weight being automatically released from the last named means in engagement of the spoon heads with a surface to free the weight for movement in the direction of the head ends of said members in moving said head ends into firm engagement with each other.

2. A testing device of the character described, comprising a pair of spoon-like members, said members comprising long shanks having spoon heads at one end, the other end of said members being offset and secured together to dispose the shanks normally in angular relationship to each other, means for attaching a drop line to the offset ends of said members, an elongated cylindrical weight arranged upon and movable longitudinally of the shanks of said members, means, on the shanks, for normally supporting the weight adjacent the second named end portion of said members, said weight being automatically released from the last named means in engagement of the spoon heads with a surface to free the weight for movement in the direction of the head ends of said members in moving said head ends into firm engagement with each other, and the spoon heads having recesses on adjacent surfaces to form, when the heads are brought together by said weight, a storage chamber.

3. A testing device of the character described, comprising a pair of spoon-like members, said members comprising long shanks having spoon heads at one end, the other end of said members being offset and secured together to dispose the shanks normally in angular relationship to each other, means for attaching a drop line to the offset ends of said members, an elongated cylindrical weight arranged upon and movable longitudinally of the shanks of said members, means, on the shanks, for normally supporting the weight adjacent the second named end portion of said members, said weight being automatically released from the last named means in engagement of the spoon heads with a surface to free the weight for movement in the direction of the head ends of said members in moving said head ends into firm engagement with each other, the spoon heads having recesses on adjacent surfaces to form, when the heads are brought together by said weight, a storage chamber, and the heads having reinforcing ribs on outer surfaces thereof in alinement with the shanks.

4. A testing device of the character described, comprising a pair of spoon-like members, said members comprising long shanks having spoon heads at one end, the other end of said members being offset and secured together to dispose the shanks normally in angular relationship to each other, means for attaching a drop line to the offset ends of said members, an elongated cylindrical weight arranged upon and movable longitudinally of the shanks of said members, means, on the shanks, for normally supporting the weight adjacent the second named end portion of said members, said weight being automatically released from the last named means in engagement of the spoon heads with a surface to free the weight for movement in the direction of the head ends of said members in moving said head ends into firm engagement with each other, the spoon heads having recesses on adjacent surfaces to form, when the heads are brought together by said weight, a storage chamber, the heads having reinforcing ribs on outer surfaces thereof in alinement with the shanks, and said ribs extending onto the shanks adjacent said heads in cam surfaces, in connection with which the weight operates in movement of the heads into engagement with each other.

5. A bottom testing device of the character described, comprising a pair of elongated members coupled, at one end, to dispose said members in angular relationship to each other, the other ends of said members having bottom engaging heads, a weight mounted for movement longitudinally of said members from the first named end to the head end thereof, means comprising a check on said members for normally supporting the weight adjacent the first named end of said members with the members arranged in diverging relationship to each other below said weight, and the check means for supporting the weight being such that any blow or force transmitted to said head ends of said members will automatically release the weight from said check means for free movement into engagement with said heads in movement of the heads into abutting engagement with each other.

6. A bottom testing device of the character described, comprising a pair of elongated members coupled, at one end, to dispose said members in angular relationship to each other, the other ends of said members having bottom engaging heads, a weight mounted for movement longitudinally of said members from the first named end to the head end thereof, means comprising a check on said members for normally supporting the weight adjacent the first named end of said members with the members arranged in diverging relationship to each other below said weight, and the check means for supporting the weight being such that any blow or force transmitted to said head ends of said members will automatically release the weight from said check means for free movement into engagement with said heads in movement of the heads into abutting engagement with each other, said members being composed of plastic material, means for reinforcing the head ends of said members, and said head ends being spoon-like in form.

References Cited in the file of this patent

UNITED STATES PATENTS

| | | |
|---|---|---|
| 296,550 | Foster | Apr. 8, 1884 |
| 732,100 | Morgan | June 30, 1903 |
| 980,045 | Bastian | Dec. 27, 1910 |
| 1,079,162 | Bundy | Nov. 18, 1913 |
| 1,553,991 | Davison et al. | Sept. 15, 1925 |
| 1,580,416 | Cromwell et al. | Apr. 13, 1926 |
| 2,349,076 | Cole | May 16, 1944 |